United States Patent
Park et al.

(10) Patent No.: US 10,319,065 B2
(45) Date of Patent: Jun. 11, 2019

(54) INTRA-FRAME REAL-TIME FREQUENCY CONTROL

(71) Applicant: Microsoft Technology Licensing, LLC, Redmond, WA (US)

(72) Inventors: Hee jun Park, Sammamish, WA (US); Ted E. Williams, Los Gatos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 55 days.

(21) Appl. No.: 15/486,809

(22) Filed: Apr. 13, 2017

(65) Prior Publication Data

US 2018/0300838 A1    Oct. 18, 2018

(51) Int. Cl.
| | |
|---|---|
| *G06T 1/20* | (2006.01) |
| *G06F 1/324* | (2019.01) |
| *G09G 5/36* | (2006.01) |
| *G09G 5/395* | (2006.01) |
| *G06F 3/14* | (2006.01) |
| *G09G 5/00* | (2006.01) |

(52) U.S. Cl.
CPC ............... *G06T 1/20* (2013.01); *G06F 1/324* (2013.01); *G06F 3/14* (2013.01); *G09G 5/001* (2013.01); *G09G 5/363* (2013.01); *G09G 5/395* (2013.01); *G09G 2330/021* (2013.01); *G09G 2340/0435* (2013.01); *G09G 2350/00* (2013.01); *G09G 2360/08* (2013.01); *Y02D 10/126* (2018.01)

(58) Field of Classification Search
CPC ........................................................ G06T 1/20
See application file for complete search history.

(56) References Cited

U.S. PATENT DOCUMENTS

| | | | |
|---|---|---|---|
| 2007/0206018 A1 | 9/2007 | Bajic et al. | |
| 2008/0079732 A1* | 4/2008 | Park .................. | G09G 3/003 345/501 |
| 2013/0179711 A1 | 7/2013 | Aelion et al. | |
| 2014/0184619 A1 | 7/2014 | Kim | |

(Continued)

FOREIGN PATENT DOCUMENTS

WO        2005098579 A2      10/2005

OTHER PUBLICATIONS

Bergman, Johan, "Energy efficient graphics", In Thesis of Uppsala University, Jun. 2010, 74 pages.

(Continued)

*Primary Examiner* — Nicholas R Wilson
(74) *Attorney, Agent, or Firm* — Alleman Hall Creasman & Tuttle LLP (57) ABSTRACT

A recommend operating frequency for a GPU is determine by an operating system. Timing information is used to estimate a time to complete the rendering of the current frame. If the estimate of the time to complete the rendering of the current frame is greater than the time left before the deadline, the operating frequency of the GPU is rapidly increased mid-frame. The new operating frequency is selected so that the rendering of the current frame can be expected to complete before the deadline arrives. Thus, when the rendering workload is low for a frame, the GPU is operated at a lower frequency thereby saving power. When the workload is high for a frame (even if the workload was lower for the previous frame), the GPU is operated at a higher frequency thereby ensuring a quality user experience.

18 Claims, 7 Drawing Sheets

(56) References Cited

U.S. PATENT DOCUMENTS

| | | |
|---|---|---|
| 2015/0015589 A1 | 1/2015 | Chung et al. |
| 2015/0074435 A1 | 3/2015 | Jane et al. |
| 2015/0177822 A1 | 6/2015 | Shoshan |
| 2015/0317762 A1 | 11/2015 | Park et al. |
| 2016/0055615 A1 | 2/2016 | Huang |
| 2016/0370844 A1 | 12/2016 | Kumar |
| 2017/0220062 A1* | 8/2017 | Shen ............... G06F 1/3265 |

OTHER PUBLICATIONS

"International Search Report and Written Opinion Issued in PCT Application No. PCT/US2018/026151", dated Jul. 18, 2018, 13 Pages.

* cited by examiner

INTRA-FRAME REAL-TIME FREQUENCY CONTROL

BACKGROUND

Integrated circuits, and systems-on-a-chip (SoC) may include multiple independent processing units (a.k.a., "cores") that read and execute instructions. These multi-core processing chips typically cooperate to implement multiprocessing. These processing cores may have specialized purposes related to the tasks they are likely to perform. For example, a specialized processor may have extra circuitry or other processing capabilities intended to give it have high performance while rendering graphics images—this type of device may be referred to, for example, as a graphics processing unit (GPU).

SUMMARY

Examples discussed herein relate to an integrated circuit that comprises a graphics processing unit (GPU) to periodically render frame images in a frame buffer. These images are intended for output to a display device. A frequency management unit is also included to control, on a per-frame basis, a processing frequency of the GPU. The selected processing frequency of the GPU is based on an estimate of a processing time for a current frame and an indicator of a remaining time before a target time to complete rendering of the current frame arrives.

In another example, a method of operating a graphics processing unit (GPU) to periodically render frame images in a frame buffer intended for output to a display device includes operating the GPU at a first processing frequency and, while a current frame is being rendered, estimating a time remaining to complete a rendering of the current frame. An indicator of the time remaining before the deadline for completing the rendering of the current frame is received. While the current frame is being rendered, and based on the estimated time remaining to complete the rendering of the current frame, the GPU is operated at a second operating frequency for at least a portion of the time remaining before the deadline for completing the rendering of the current frame arrives.

In another example, a method of operating a graphics processing unit (GPU) to periodically render frame images in a frame buffer intended for output to a display device includes: before receiving the command to begin rendering a frame, operating the GPU at a first processing frequency; before receiving the command to begin rendering the frame, estimating a time remaining to complete the rendering of the frame; receiving an indicator of the time remaining before the deadline for completing the rendering of the frame; and, before receiving the command to begin rendering the frame, and based on the estimated time remaining to complete the rendering of the frame, operating the GPU at a second operating frequency for at least a portion of the time remaining before the arrival of the deadline for completing the rendering of the frame.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

In order to describe the manner in which the above-recited and other advantages and features can be obtained, a more particular description is set forth and will be rendered by reference to specific examples thereof which are illustrated in the appended drawings. Understanding that these drawings depict only typical examples and are not therefore to be considered to be limiting of its scope, implementations will be described and explained with additional specificity and detail through the use of the accompanying drawings.

DETAILED DESCRIPTION OF THE EMBODIMENTS

Examples are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a computing device, or an integrated circuit.

Virtual reality (VR), augmented reality (AR), and mixed reality (MR) are applications typically having deadlines for frame rendering. If these deadlines are missed, the resulting display seen by the user may be unacceptable and or unpleasant. For example, motion-to-display latency, a low frame-rate, missing frames, etc. can ruin the illusion of 'reality' in a VR, AR, and/or MR application. These problems may also induce dizziness or other unwanted sensations in the user.

In an embodiment, a recommend operating frequency for a GPU is determine by an operating system (e.g., OS or graphics driver). Timing related information is received before or during the rendering of a frame. Part of this timing information is used to estimate a time to complete the rendering of the current frame. Another part of this information is used to determine how much time is left before the deadline for the current frame to be rendered arrives. If the estimate of the time to complete the rendering of the current frame (plus an optional guard interval) is greater than the time left before the deadline, the operating frequency of the GPU is rapidly (e.g., in less than 1 ms) increased mid-frame. The new operating frequency is selected so that the rendering of the current frame can be expected to complete before the deadline arrives. This process is repeated for each frame so that, as the rendering workload varies from frame-to-frame, the operating frequency of the GPU also varies. Thus, when the rendering workload is low for a frame, the GPU is operated at a lower frequency thereby saving power. When the workload is high for a frame (even if the workload was lower for the previous frame), the GPU is operated at a higher frequency thereby ensuring a quality user experience.

Figure 1:
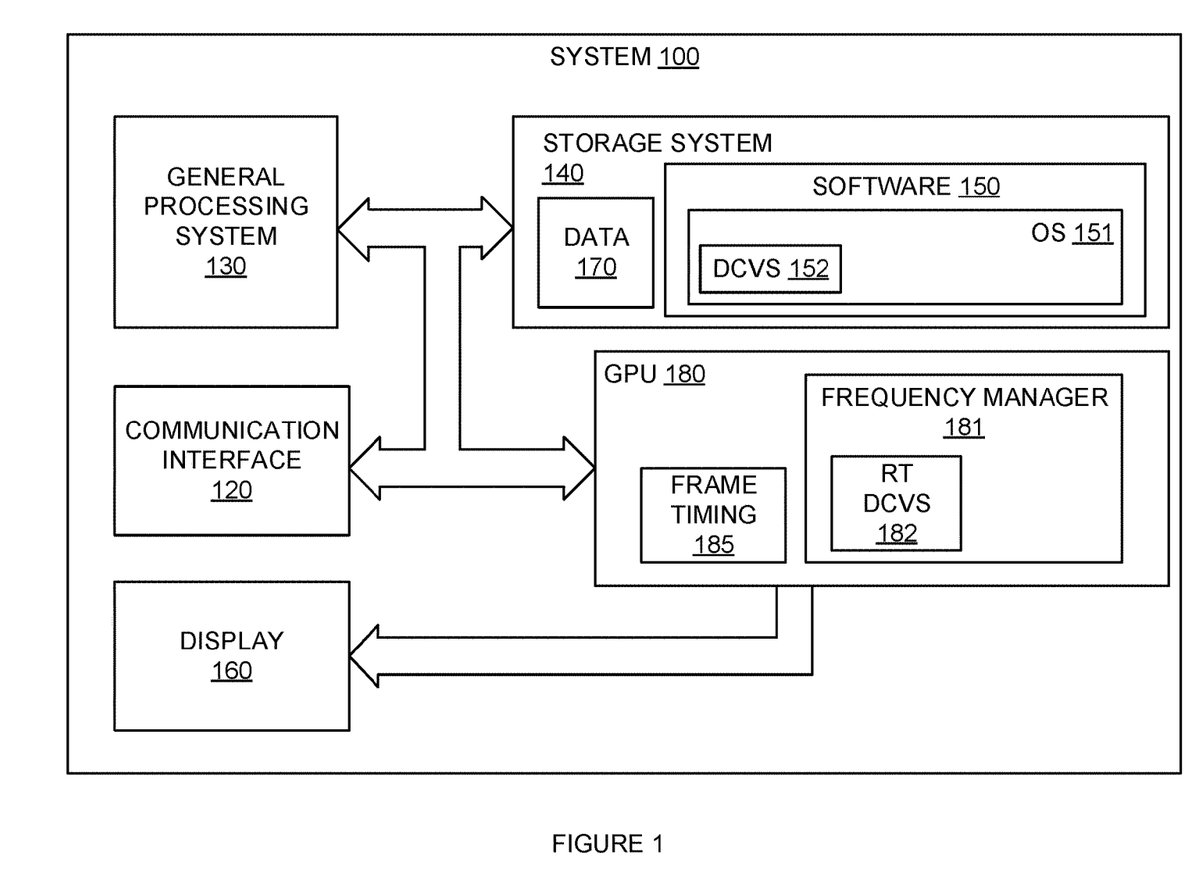
FIG. 1 is a block diagram illustrating a computing system.

FIG. 1 is a block diagram illustrating a computing system. System 100 and/or its components include circuits, software, and/or data that implement, or are used to implement, the methods, systems and/or devices illustrated in the Figures, the corresponding discussions of the Figures, and/or are otherwise taught herein. System 100, and/or its components, may be and/or include one or more integrated circuits (e.g., GPU 180 may be an integrated circuit.)

System 100 includes communication interface 120, general processing system 130, storage system 140, display 160, and graphics processing unit (GPU) 180. General processing system 130 is operatively coupled to storage system 140. Storage system 140 stores software 150 and data 170. Software 150 may include operating system (OS) 151 and dynamic clock and voltage scaling software 152. General processing system 130 is operatively coupled to communication interface 120 and GPU 180.

General processing system 130 may comprise one or more general-purpose microprocessors. General processing system 130 may comprise programmable or special purpose circuitry such as floating point processors and network processors. General processing system 130 may be distributed among multiple devices, processors, storage, and/or interfaces.

GPU 180 is a type of specialized processor designed for the rapid creation of images in a memory called a frame buffer. Once a representation of an image is created in a frame buffer, it is typically output to a display device 160. GPUs may be used in, for example, game consoles, personal computers, personal computers, and mobile phones. GPUs are typically configured to be efficient at creating and manipulating computer graphics and images. The highly parallel structure of GPUs typically make them more efficient at creating and processing images than general-purpose processors. In an embodiment, GPU 180 includes frequency manager 181 and frame timing 185. Frequency manager 181 include real-time dynamic clock and voltage scaling (RT DCVS) 182. RT DCVS 182 may be, for example, implemented in hardware (e.g., a finite state machine) and/or software/firmware that is executed by GPU 180.

Communication interface 120 may comprise a network interface, modem, port, bus, link, transceiver, or other communication device. Communication interface 120 may be distributed among multiple communication devices. Display 160 may comprise a graphical display, touch screen, or other type of display component or device. Storage system 140 may comprise a disk, tape, integrated circuit, RAM, ROM, EEPROM, flash memory, network storage, server, or other memory function. Storage system 140 may include computer readable medium. Storage system 140 may be distributed among multiple memory devices.

General processing system 130 retrieves and executes software 150 from storage system 140. General processing system may retrieve and execute software 150 that includes an operating system (OS) 151. Operating system 151 may include DCVS software 152 that calculates one or more operating parameters (e.g., operating frequency and operating voltage) to be applied to GPU 180 by default. General processing system 130 may retrieve and store data 170. General processing system 130 may also retrieve and store data via communication interface 120. General processing system 150 may create or modify software 150 or data 170 to achieve a tangible result. General processing system 130 may control communication interface 120 or display 160 (via GPU 180) to achieve a tangible result. General processing system 130 may retrieve and execute remotely stored software via communication interface 120.

Software 150 and remotely stored software may comprise an operating system 151, utilities, drivers (e.g., DCVS 152), networking software, and other software typically executed by a computer system. Software 150 may comprise an application program, applet, firmware, or other form of machine-readable processing instructions typically executed by a computer system. Software 150 may comprise one or more VR, AR, and/or MR application programs, applets, firmware, or other form of machine-readable instructions to create a VR, AR, and/or MR experience when viewed via display 160. When executed by processing system 130, software 150 or remotely stored software may direct system 100 to operate as described herein.

In an embodiment, frequency manager 181 uses information from frame timing 185 to monitor intra-frame timing and activity to control the operating frequency of GPU 180 for each frame. Because frequency manager 181, frame timing 185, and RT DCVS 182 are part of GPU 180, frequency manager 181 is able to rapidly (relative to the frame rate) change the operating frequency of GPU 180. For example, if GPU 180 is rendering a frame every 20 ms (i.e., a 50 Hz refresh rate) frequency manager 181 may be able to change the operating frequency of GPU 180 in 1 ms. This ability to periodically change (i.e., increase or decrease) the operating frequency of GPU 180 over an interval that is much less (e.g., ±20) than the frame rate allows frequency manager 181 to make these operating frequency changes mid-frame. The ability to change the operating frequency of GPU 180 mid-frame allows frequency manager 181 to change the operating frequency used to render a frame while that frame is being rendered and have the new operating frequency affect the amount of time GPU 180 takes to render that frame (as opposed to only affecting the rendering time of subsequent frames and/or only being able to change the rendering time every N frames where N>1.)

Frequency manager 181 receives, from OS 150 and/or DCVS 152 an indicator of a recommended (e.g., default) operating frequency. Frequency manager 181 also receives timing information from frame timing 185. This timing information may include, for example, timer values that correspond to the current time, the time when GPU 180 was instructed to start rendering (i.e., draw call submission time), the time of the last frame deadline, and the predicted time of the current frame deadline. In an example, frame deadline times correspond to the timing of a vertical synchronization signal, $V_{sync}$, being sent by GPU 180 to display 160.

To select an operating frequency on a frame by frame basis, for each frame, frequency manager 181 can receive from, and/or calculate, the following values using the information from frame timing 185: (1) $T_{Vsync}$: the total time between rendering deadlines (e.g., $V_{sync}$ pulses); (2) $T_{elapsed}$: the elapsed time since the last rendering deadline to the current time; (3) $T_c$: time between the start of the current frame rendering time (i.e. last deadline) and the time processor 130 controlled GPU 180 to start rendering (i.e., the time from the start of the current frame to the time GPU 180 started rendering the current frame); (4) $T_R$: a predicted (or estimated) time GPU 180 will take to render the current frame; (5) $T_V$: an estimation of the variation, in time, that GPU 180 takes to render successive frames; and, (6) $T_G$: a guard time that adds margin in order to ensure GPU 180 completes rendering the current frame before the next deadline.

$T_R$ can be calculated based on an average of the rendering time of recently rendered frames. For example, $T_R$ can be calculated based on a moving average of the rendering times of the last few (e.g., 1, 2, 3, etc.) frames. In another example, $T_R$ can be calculated based on a weighted moving average (e.g., an exponential window) of the rendering times over previous frames. $T_v$ can be calculated from similar information (e.g., variations in $T_R$) from frame timing 185.

In an embodiment, when a command to start rendering each frame is received by GPU 180, frequency manager 181 compares the estimated workload (i.e., estimated rendering time) and the remaining time before the next rendering deadline (e.g., $V_{sync}$). This comparison detects early and/or late draw calls and enables frequency manager 181 to adjust GPU 180's operating frequency accordingly. If the predicted remaining rendering time is larger than the remaining time to the next rendering deadline, frequency manager 181 calculates and applies a new frequency level (e.g., higher frequency than the current level) in order to avoid missing the rendering deadline. If the predicted remaining rendering time is smaller than the remaining time to next rendering deadline, frequency manager 181 calculates and applies a new frequency level (lower frequency than the current level) to reduce power consumption without missing the rendering deadline. To calculate the new frequency, frequency manager 181 may use to following: (i) a predicted remaining time to render the current frame ($T_{RR}=T_C+T_R-T_{elapsed}$); (ii) a remaining time until the rendering deadline ($T_{rmng}=T_{Vsync}-T_{elapsed}$); and, a remaining time until the rendering deadline that includes a guard time ($T_{Grmng}=T_{Vsync}-T_{elapsed}-T_G$); and $F_{new}=F_{old}\times(T_C+T_R-T_{elapsed})/(T_{Vsync}-T_{elapsed})$, where $F_{old}$ is the current operating frequency of GPU 180 and $F_{new}$ is the new frequency. However, if this calculated $F_{new}$ is less than the value received from OS 150 and/or DCVS 152, $F_{new}$ is set to be the value received from OS 150 and/or DCVS 152.

In an embodiment, to select an operating frequency on a frame by frame basis, for each frame, after the rendering of the current frame has begun, frequency manager 181 compares the estimated workload (i.e., estimated total rendering time) and the rendering time that has passed so far in the current frame. This comparison detects rapid changes in the rendering workload and enables frequency manager 181 to adjust GPU 180's operating frequency accordingly. If the rendering time so far is a threshold (or formula) amount larger than the predicted total workload (rendering time), frequency manager 181 may increase the operating frequency of GPU 180 by a predetermined ratio to avoid missing the rendering deadline. To calculate the new frequency, frequency manager 181 may use the following: (a) the time GPU 180 has spent rendering the current frame so far ($T_{elapsed}-T_C$); (b) a revised predicted remaining time to render the current frame ($T_{revRR}=T_C+W\times T_R-T_{elapsed}$); (c) and $F_{new}=F_{old}\times(T_C+T_R-T_{elapsed})/(T_{Vsync}-T_{elapsed})$. However, if this calculated $F_{new}$ is less than the value received from OS 150 and/or DCVS 152, $F_{new}$ is set to be the value received from OS 150 and/or DCVS 152. In the foregoing, where $F_{old}$ is the current operating frequency of GPU 180; $F_{new}$ is the new frequency; and, W is a predetermined constant (e.g., a measurement or estimate of the worst case frame-to-frame workload increase/change—typically, $W\approx1.1$ which implies an assumed workload change of approximately 10% between successive frames as the worst case).

Accordingly, it should be understood that system 100 (and frequency manager 181, in particular) can monitor the per-frame rendering workload (as expressed in rendering time) and the per-frame rending deadline ($V_{sync}$ timing) in order to override a default GPU 180 operating frequency set by OS 150 and/or DCVS 152. This can be done periodically for each frame. Thus, frequency manager 181 can determine a GPU 180 operating frequency for rendering each frame, just before or during, the rendering of that frame based on when GPU 180 starts rendering that frame, and the remaining time to the deadline for rendering that frame. Typically, this operating frequency can be greater than the floor (default) frequency set by OS 150 and/or DCVS 152.

In an embodiment, GPU 180 is to periodically render frame images in a frame buffer intended for output to display device 160. Frequency manager 181 periodically (e.g., at the frame rate or more) controls, on a frame by frame basis, a processing frequency of GPU 180 based on an estimate of the processing time for the current frame ($T_{RR}$) and an indicator of a remaining time before a target time to complete the rendering of the current frame arrives. Frequency manager 181 nevertheless sets a minimum processing frequency based on an indicator controlled by an operating system 151 and/or an operating system component (e.g., DCVS 152.)

The target time to complete the rendering of the current frame may be based on an indicator of the remaining time until a vertical synchronization signal (e.g., Vsync) occurs. The estimate of the processing time for the current frame may be based, for example, on measured indicators of a plurality of processing times associated with corresponding plurality of previously rendered frames. The estimate of the processing time for the current frame may be based, for example, on an average (and, in some examples, a weighted average) of a plurality of processing times associated with recently rendered frames. Frequency manager 181 may change the processing frequency of GPU 180 after GPU 180 has started rendering the current frame. Frequency manager 181 may change the processing frequency of GPU 180 before GPU 180 has started rendering the current frame.

In an embodiment, GPU 180 is configured to periodically, at a frame rate, render frame images in a frame buffer that is intended for output to a display 160. GPU 180 is first configured to operate at a first processing frequency (e.g., frequency of operation used while rendering the last frame and/or the 'default' frequency determined by OS 151.) For each frame, while the current frame is being rendered by GPU 180, frequency manager 181 estimates the time remaining to complete the rendering of the current frame. The time remaining to complete the rendering of the current frame may be based on the previous rendering times of one or more immediately preceding frames.

For each frame, frequency manager 181 receives an indicator of the time remaining before a deadline for completing the rendering of the current frame. While the current frame is being rendered by GPU 180, and based on the estimated time remaining to complete the rendering of the current frame, frequency manager 181 causes GPU 180 to operate at a second operating frequency for at least a portion of the time remaining before the deadline for completing the rendering of the current frame arrives.

GPU 180 may be operated by frequency manager 181 at the second operating frequency based on the estimated time remaining to complete the rendering of the current frame exceeding the time remaining before the deadline for completing the rendering of the current frame. GPU 180 may be operated by frequency manager 181 at the second operating frequency based on the time remaining before the deadline for completing the rendering of the current frame exceeding the estimated time remaining to complete the rendering of the current frame.

While a successive frame is being rendered, frequency manager 181 may estimate a second time remaining to complete the rendering of the successive frame. Frequency manager 181 may receive a second indicator of a second time that remains before a second deadline for completing the rendering of the successive frame. While the successive frame is being rendered, and based on the second estimated time remaining to complete the rendering of the successive frame, frequency manager 181 may operate the GPU 180 at the first operating frequency for at least a second portion of the second time remaining before the deadline for completing the rendering of the successive frame arrives.

In an embodiment, GPU 180 periodically (e.g., every frame) renders frame images in a frame buffer intended for output to display 160. Before receiving a command to begin rendering a current frame, frequency manager 181 operates the GPU 180 at a first processing frequency. Frequency manager 181 receives an indicator (e.g., from frame timing 185) of the time remaining before the deadline for completing the rendering of the current frame. Before receiving the command to begin rendering the current frame, and based on the estimated time remaining to completely render the current frame, frequency manager 181 operates GPU 180 at a second operating frequency (either higher or lower than the first operating frequency) for at least a portion of the time remaining before the arrival of the deadline for completing the rendering of the current frame.

The first processing frequency may be a default or 'floor' frequency determined by operating system 151 and/or DCVS 152. GPU 180 may be operated at the second operating frequency based on the estimated time remaining to complete the rendering of the current frame exceeding the time remaining before the first deadline for completing the rendering of the current frame. GPU 180 may be operated at the second operating frequency based on the time remaining before the first deadline for completing an already started rendering of the current frame exceeding the estimated time remaining to complete the rendering of the current frame.

After receiving the first command to begin rendering the current frame, and before receiving a second command to begin rendering a successive frame, frequency manager 181 may operate the GPU 180 at the second processing frequency. Frequency manager 181 may, before receiving the command to begin rendering the successive frame, estimate a second time remaining to completely render of the successive frame. Frequency manager 181 may receive an indicator of a second time remaining before a second deadline for completing the rendering of the successive frame. Before receiving the command to begin rendering the successive frame, and based on the estimated time remaining to complete the rendering of the successive frame, frequency manager 181 may operate GPU 180 at the first operating frequency for at least a portion of the time remaining before the second deadline for completing the rendering of the successive frame arrives.

Figure 2:
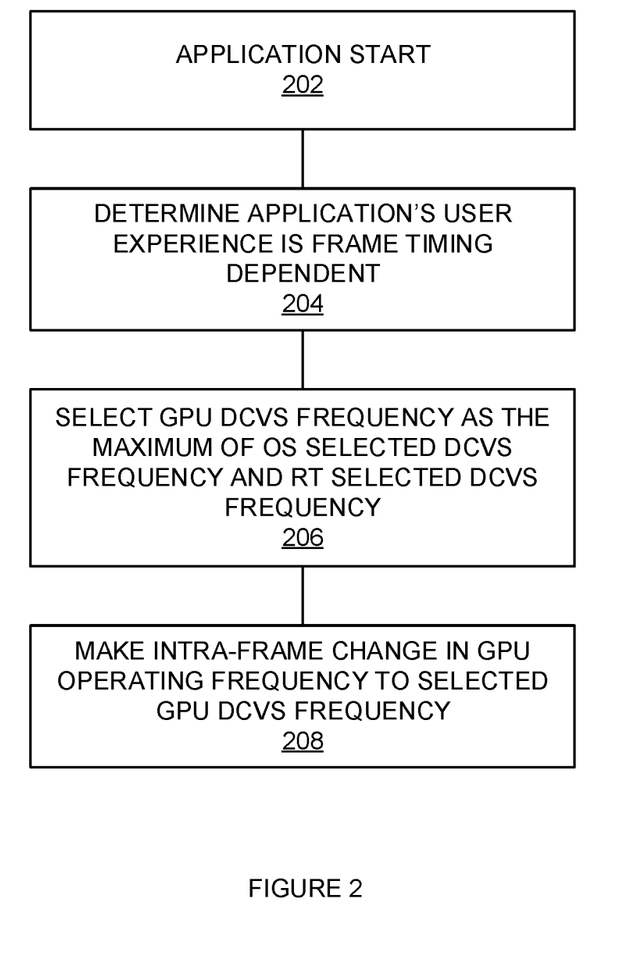
FIG. 2 is a flowchart illustrating a method of dynamic clock and voltage scaling (DCVS).

FIG. 2 is a flowchart illustrating a method of dynamic clock and voltage scaling (DCVS). The steps illustrated in FIG. 2 may be performed, for example, by one or more elements of system 100 and/or its components. An application is started (202). For example, an application stored in storage 140 and processed by general processing system 130 may be started. It is determined that the application's user experience is frame timing dependent (204). For example, system 100 (and general processing system 130, under control of software 150, in particular) may determine that the started application is to provide a VR, AR, or MR experience to a user. Thus, if frame timing deadlines are missed by GPU 180, the resulting images on display 160 as seen by the user may be unacceptable and or unpleasant.

A GPU DCVS frequency is selected as the maximum of an operating system selected DCVS frequency and a real-time selected DCVS frequency (206). For example, frequency manager 181 may monitor the per-frame rendering workload and the per-frame rending deadline in order to override a default GPU 180 operating frequency set by OS 150 and/or DCVS 152. An intra-frame change in GPU operating frequency to the selected GPU DCVS frequency is made (208). For example, frequency manager 181 may select between an operating frequency set by OS 150 and/or DCVS 152 and an operating frequency that frequency manager 181 has calculated based on timing information from frame timing 185. Frequency manager 181 may then change the operating frequency of GPU 180 to the selected frequency.

Figure 3:
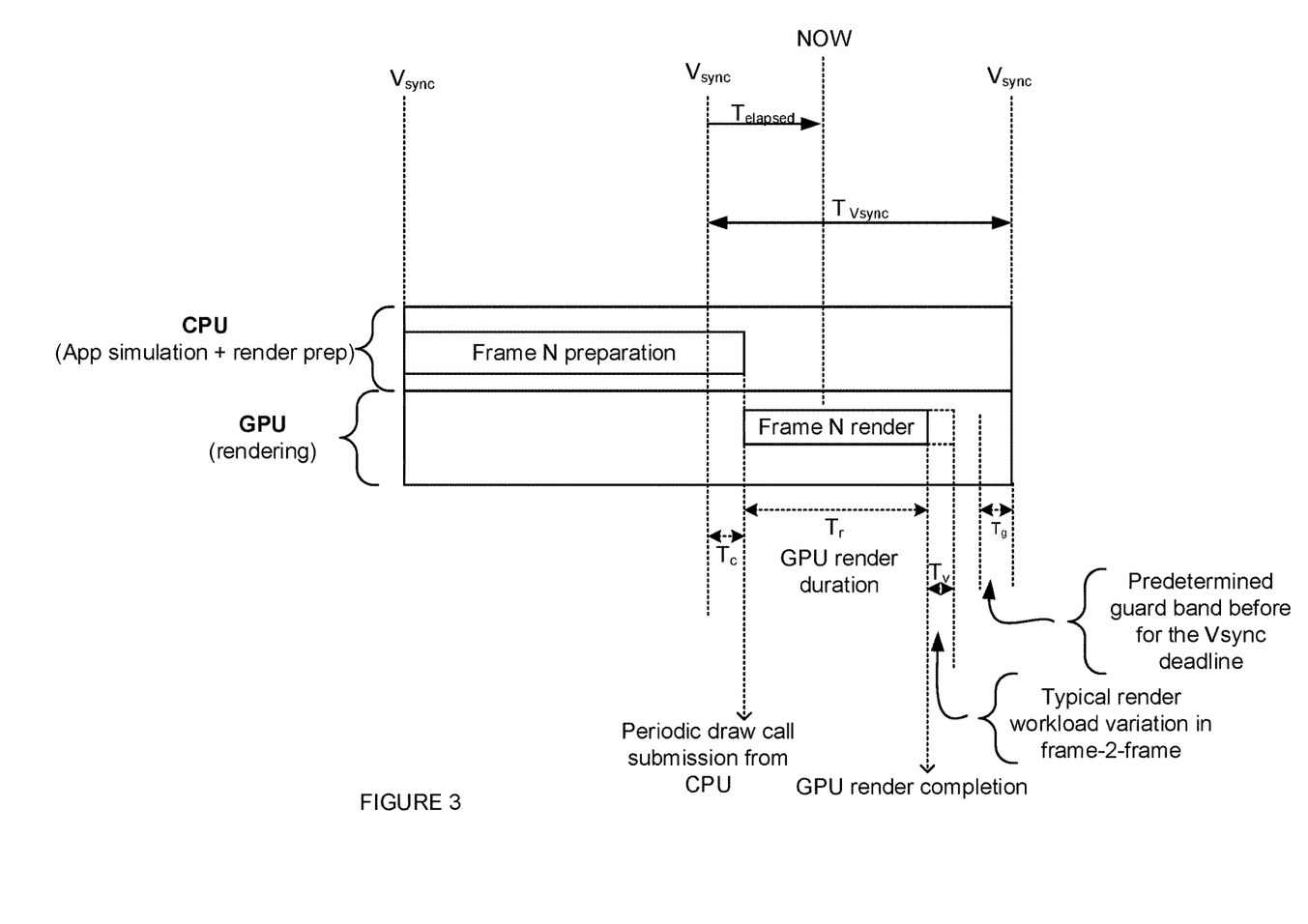
FIG. 3 illustrates example timing of events and intervals that occur on a per-frame basis.

FIG. 3 illustrates example timing of events and intervals that occur on a per-frame basis. The timing of events and intervals illustrated in FIG. 3 include the time (now) when frequency manager 181 is deciding whether to change the operating frequency of GPU 180, $T_{Vsync}$, $T_{elapsed}$, $T_c$, $T_R$, $T_v$, and $T_G$.

Figure 4:
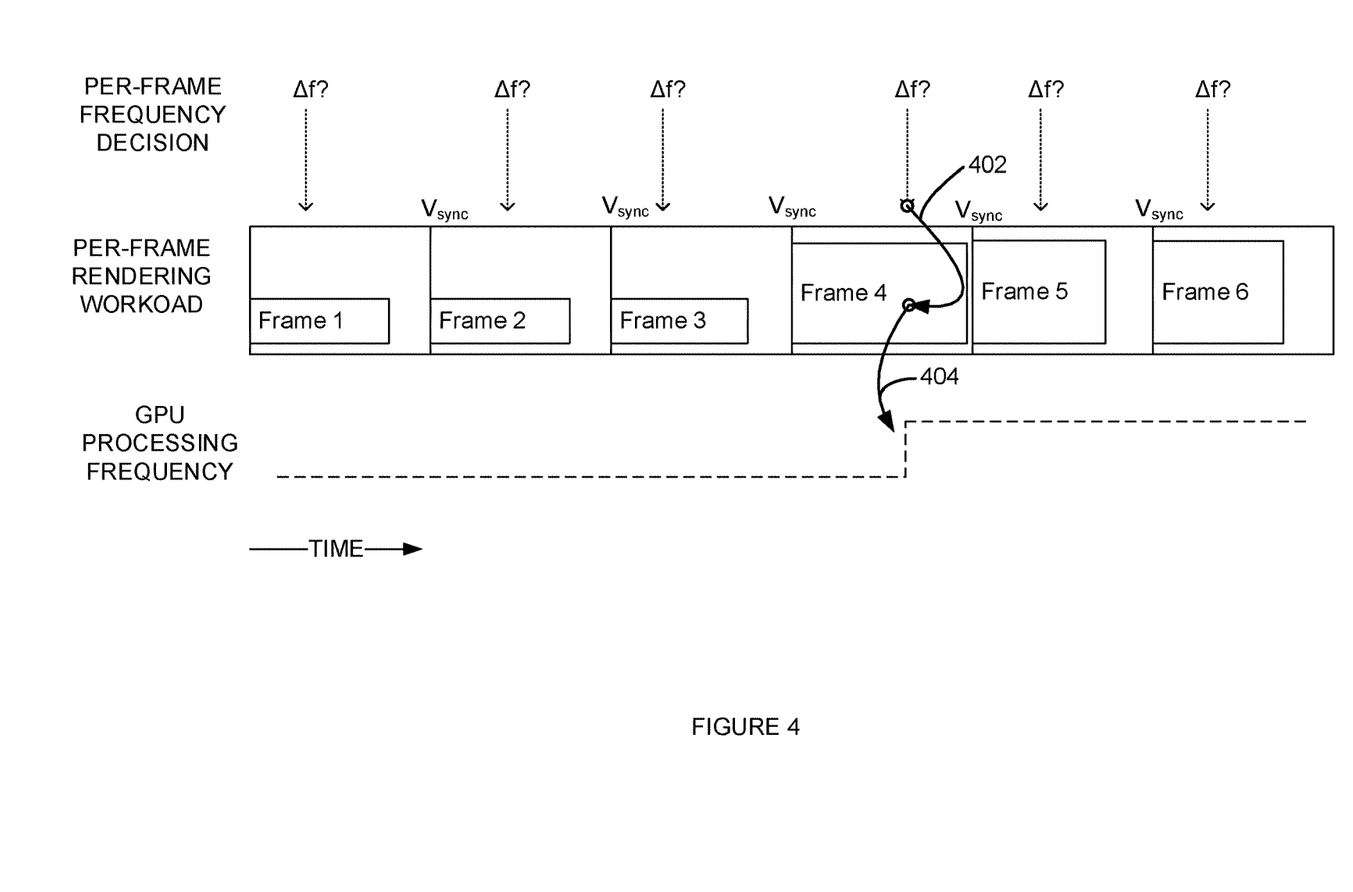
FIG. 4 illustrates an example graphics processing unit operating frequency change.

FIG. 4 illustrates an example graphics processing unit operating frequency change. In FIG. 4, the estimated per-frame workload is illustrated for frames 1-6. A smaller workload is illustrated for frames 1-3. A larger workload is illustrated for frames 4-6. As can be seen in FIG. 4, a periodic per-frame frequency decision is made during each frame. This frequency decision is based on the workload per-frame workload. In FIG. 4, the per-frame frequency decision associated with frame 4 determines that the operating frequency of GPU 180 is increased during the rendering of frame 4. In FIG. 4, this frequency change determination is illustrated by arrow 402 and the resulting increase in operating frequency is pointed out by arrow 404.

Figure 5:
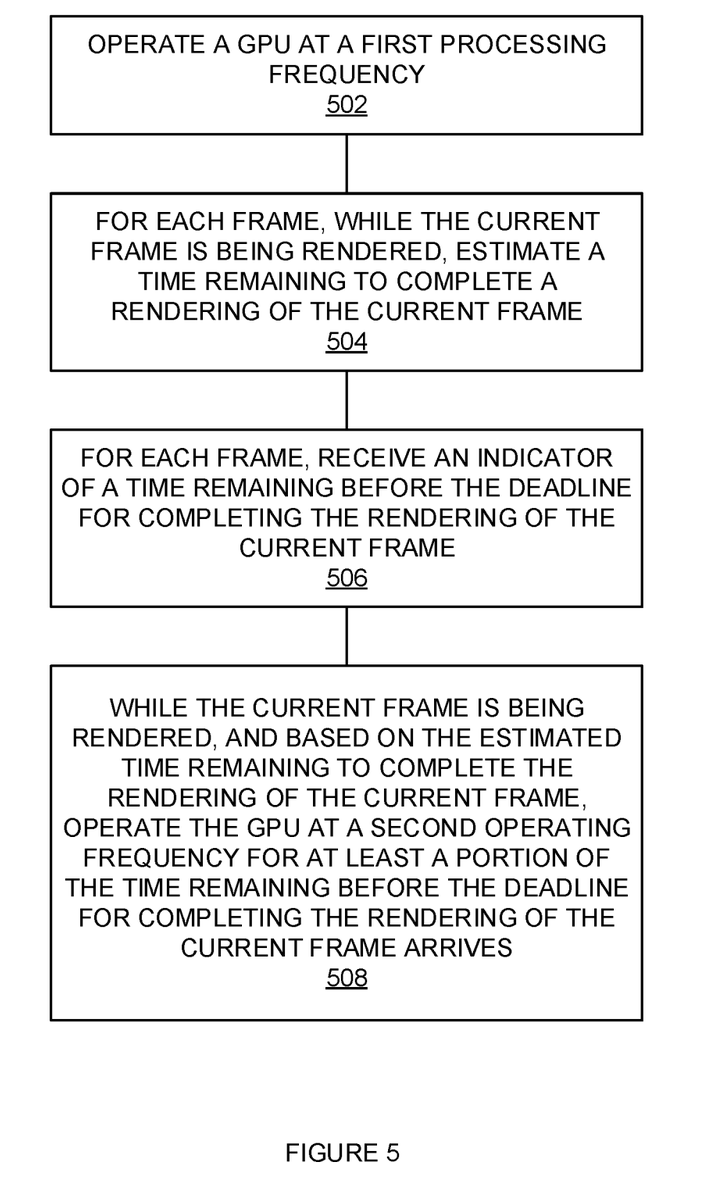
FIG. 5 is a flowchart illustrating a method of operating a graphics processing unit to periodically render frame images.

FIG. 5 is a flowchart illustrating a method of operating a graphics processing unit to periodically, at a frame rate, render frame images. The steps illustrated in FIG. 5 may be performed, for example, by one or more elements of system 100 and/or its components. The steps illustrated in FIG. 5 may be, for example, repeated periodically. The steps illustrated in FIG. 5 may be repeated periodically at a rate that is at least the frame rate such that the operating frequency of GPU 180 may be controlled to change at least once per-frame. A graphics processing unit is operated at a first processing frequency (502). For example, GPU 180 may be operated at a 'default' or 'floor' frequency that is determined by operating system 151 and/or DCVS 152. In another example, GPU 180 may be operated at a frequency that is determined by frequency manager 181 and/or real-time DCVS 182. Frequency manager 181 and/or real-time DCVS 182 may select a per-frame operating frequency for GPU 180 based on timing information received from frame timing 185. Frequency manager 181 and/or real-time DCVS 182 may select a per-frame operating frequency for GPU 180 based on workload information associated with the rendering of one or more previous frames (e.g., time to completely render).

For each frame, while the current frame is being rendered, a time remaining to complete a rendering of the current frame is estimated (504). For example, based on timing information from frame timing 185, frequency manager 181 and/or OS 151 may estimate the amount of it will take to complete the rendering of the frame GPU 180 is currently rendering. This estimate may be based on the time to render the immediately previous frame and the amount of time GPU 180 has already spent rendering the current frame. This step may be, for example, repeated periodically. This step may be repeated periodically at a rate that is at least the frame rate such that the operating frequency of GPU 180 may be controlled to change at least once per-frame.

For each frame, an indicator of a time remaining before the deadline for completing the rendering of the current frame is received (506). For example, frame timing 185 may supply frequency manager 181 with timing information related to the current frame. This time information may include an indicator associated with a deadline (such as remaining time until the next $V_{sync}$ occurs, or time elapsed since the previous $V_{sync}$ occurred) for completing the rendering of the current frame. In another example, frequency manager 181 may calculate the time remaining before the next rendering deadline based on information from frame timing 185.

While the current frame is being rendered, and based on the estimated time remaining to complete the rendering of the current frame, the GPU is operated at a second operating frequency for at least a portion of the time remaining before the deadline for completing the rendering of the current frame arrives (508). For example, while GPU 180 is rendering a frame, frequency manager 181 may control real-time DCVS 182 to change the operating frequency of GPU 180 based on the estimate of how much time will be required to complete the rendering of the current frame. Frequency manager 181 may make this change to the operating frequency of GPU 180 further based on how much time is left before the deadline.

In another example, GPU 180 is operated at the second operating frequency based on the estimated time remaining to complete the rendering of the current frame exceeding the time remaining before the deadline for completing the rendering of the current frame. In this case, the second operating frequency selected by frequency manager 181 should be greater than the first operating frequency. In another example, GPU 180 is operated at the second operating frequency based on the time remaining before the deadline for completing the rendering of the current frame exceeding the estimated time remaining to complete the rendering of the current frame while operating GPU 180 at the first operating frequency. The second operating frequency selected by frequency manager 181 should also be greater than the first operating frequency.

It should be understood that the operating frequency of GPU 180 can be reduced when the frame rendering workload decreases. For example, after frequency manager 181 has increased to operating frequency of GPU 180, frequency manager 181 may estimating a second time remaining to complete the rendering of a successive frame while that successive frame is being rendered. A second indicator of a second time remaining before the deadline for completing the rendering of the successive frame may be received (e.g., from frame timing 185.) Then, while the successive frame is being rendered, and based on the second estimated time remaining to complete the rendering of the successive frame, frequency manager 181 may reduce the operating frequency of GPU 180 down to the first operating frequency for at least a second portion of the second time remaining before the deadline for completing the rendering of the successive frame arrives.

Figure 6:
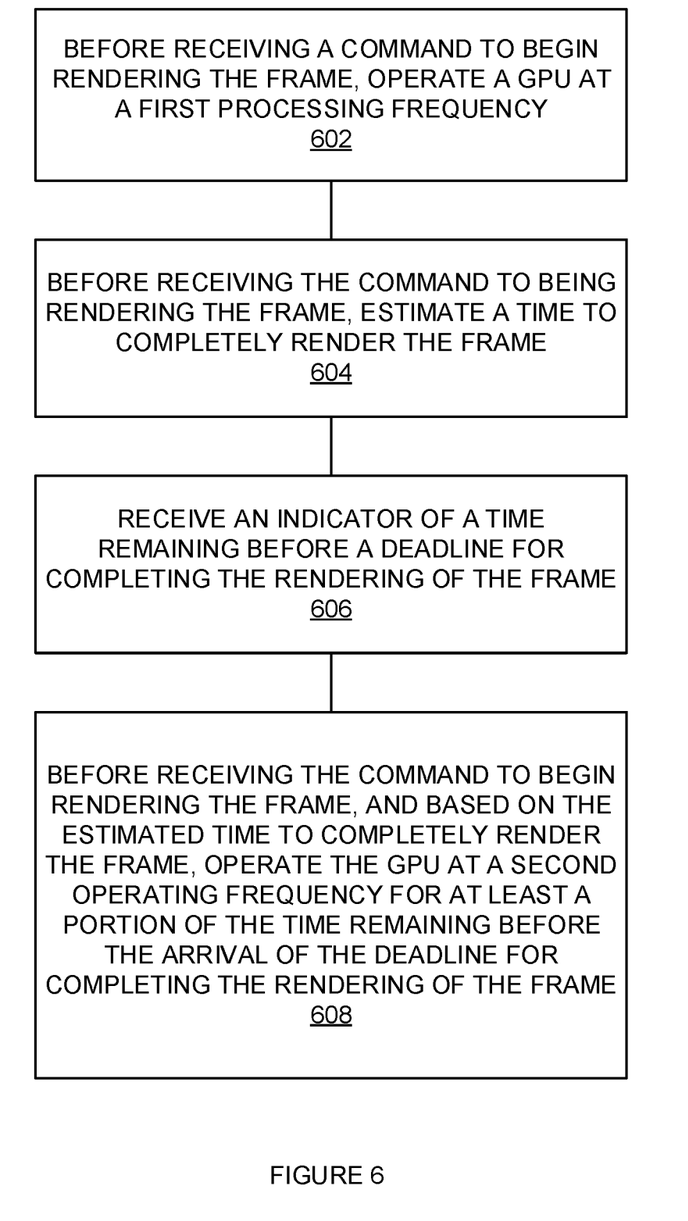
FIG. 6 is a flowchart illustrating a method of periodically rendering frame images.

FIG. 6 is a flowchart illustrating a method of periodically rendering frame images. The steps illustrated in FIG. 6 may be performed, for example, by one or more elements of system 100 and/or its components. The steps illustrated in FIG. 6 may be, for example, repeated periodically. The steps illustrated in FIG. 6 may be repeated periodically at a rate that is at least the frame rate such that the operating frequency of GPU 180 may be controlled to change at least once per-frame. Before receiving a command to begin rendering a frame, a graphics processing unit is operated at a first operating frequency (602). For example, GPU 180 may be operated at a 'default' or 'floor' frequency that is determined by operating system 151 and/or DCVS 152. In another example, GPU 180 may be operated at a frequency that is determined by frequency manager 181 and/or real-time DCVS 182. Frequency manager 181 and/or real-time DCVS 182 may select a per-frame operating frequency for GPU 180 based on timing information received from frame timing 185. Frequency manager 181 and/or real-time DCVS 182 may select a per-frame operating frequency for GPU 180 based on workload information (e.g., time to completely render) associated with the rendering of one or more previous frames.

Before receiving the command to begin rendering the frame, a time remaining to completely render the frame is estimated (604). For example, based on timing information from frame timing 185, frequency manager 181 and/or OS 151 may estimate the amount of time it will take to completely render the frame GPU 180 is about to begin rendering. This estimate may be based on the time to render one or more previous frames.

An indicator of a time remaining before the deadline for completing the rendering of the current frame is received (606). For example, frame timing 185 may supply frequency manager 181 with timing information related to the current frame. This time information may include an indicator associated with a deadline (such as remaining time until the next $V_{sync}$ occurs, or time elapsed since the previous $V_{sync}$ occurred) for completing the rendering of the current frame. In another example, frequency manager 181 may calculate the time remaining before the next rendering deadline based on information from frame timing 185.

Before receiving the command to begin rendering the frame, and based on the estimated time to completely render the frame, the GPU is operated at a second operating frequency for at least a portion of the time remaining before the arrival of the deadline for completing the rendering of the frame (608). For example, before GPU 180 starts rendering a frame, frequency manager 181 may control real-time DCVS 182 to change the operating frequency of GPU 180 based on the estimate of how much time will be required to completely render the current frame. Frequency manager 181 may make this change to the operating frequency of GPU 180 further based on how much time is left before the deadline.

Figure 7:
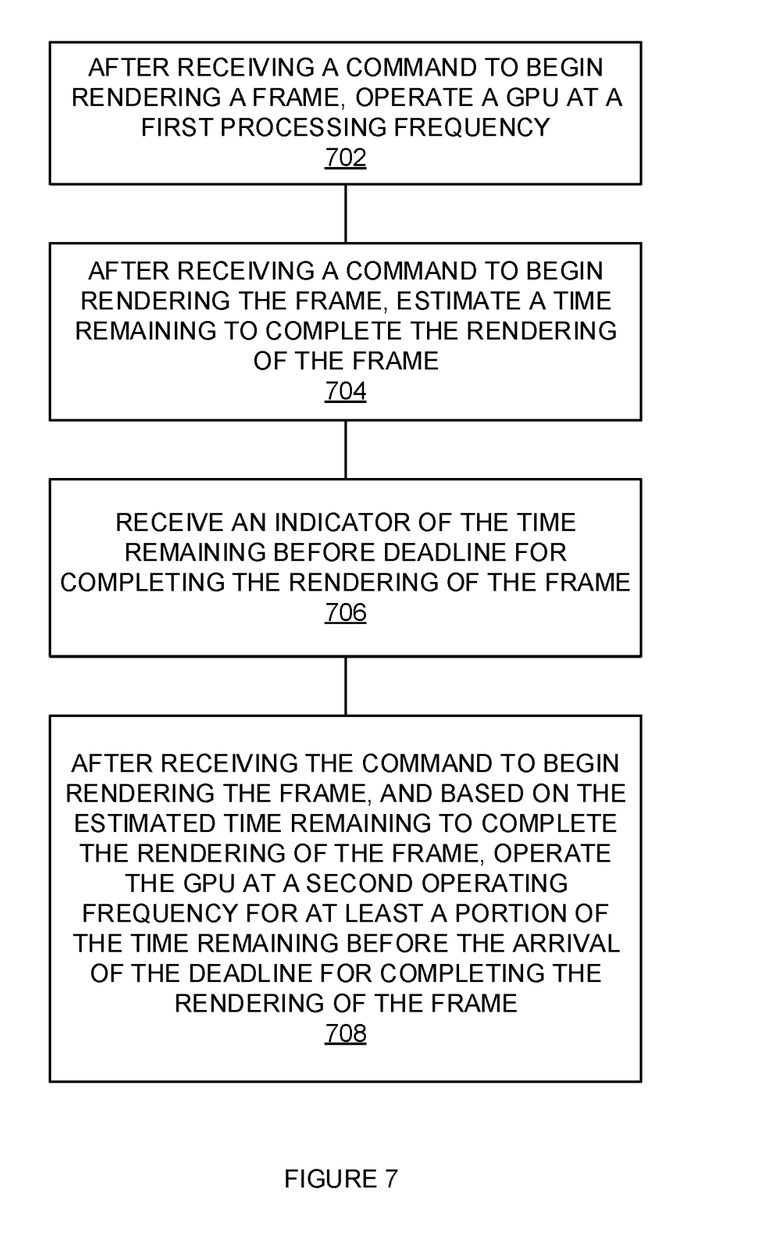
FIG. 7 is a flowchart illustrating a method of adjusting a processing frequency of a graphics processing unit.

FIG. 7 is a flowchart illustrating a method of adjusting a processing frequency of a graphics processing unit. The steps illustrated in FIG. 7 may be performed, for example, by one or more elements of system 100 and/or its components. The steps illustrated in FIG. 7 may be, for example, repeated periodically. The steps illustrated in FIG. 7 may be repeated periodically at a rate that is at least the frame rate such that the operating frequency of GPU 180 may be controlled to change at least once per-frame. After receiving a command to begin rendering a frame, a CPU is operated at a first processing frequency (702). For example, during the first part of rendering a frame GPU 180 may be operated at a 'default' or 'floor' frequency that is determined by operating system 151 and/or DCVS 152. In another example, during the first part of rendering a frame, GPU 180 may be operated at a frequency that is determined by frequency manager 181 and/or real-time DCVS 182. Frequency manager 181 and/or real-time DCVS 182 may select this starting operating frequency for GPU 180 based on timing information received from frame timing 185. Frequency manager 181 and/or real-time DCVS 182 may select this starting operating frequency for GPU 180 based on workload information (e.g., time to completely render) associated with the rendering of one or more previous frames.

After receiving a command to begin rendering the frame, a time remaining to complete the rendering of the frame is estimated (704). For example, after GPU 180 has partially rendered the frame while operating at the first frequency, and based on timing information from frame timing 185, frequency manager 181 and/or OS 151 may estimate the amount of time it will take to complete the rendering of the frame GPU 180 is currently rendering. This estimate may be based on the time to render the immediately previous frame, the amount of time GPU 180 has already spent rendering the current frame, and the current operating frequency of GPU 180.

An indicator of the time remaining before the deadline for completing the rendering of the frame is received (706). For example, frame timing 185 may supply frequency manager 181 with timing information related to the current frame. This time information may include an indicator associated with a deadline (such as remaining time until the next $V_{sync}$ occurs, or time elapsed since the previous $V_{sync}$ occurred) for completing the rendering of the current frame. In another example, frequency manager 181 may calculate the time remaining before the next rendering deadline based on information from frame timing 185.

After receiving the command to begin rendering the frame, and based on the estimated time remaining to complete the rendering of the frame, the GPU is operated at a second operating frequency for at least a portion of the time remaining before the arrival of the deadline for completing the rendering of the frame (708). For example, while GPU 180 is rendering a frame, frequency manager 181 may control real-time DCVS 182 to change the operating frequency of GPU 180 based on the estimate of how much time will be required to complete the rendering of the current frame. Frequency manager 181 may make this change to the operating frequency of GPU 180 further based on how much time is left before the deadline.

Implementations discussed herein include, but are not limited to, the following examples:

EXAMPLE 1

An integrated circuit, comprising: a graphics processing unit (GPU) to periodically render frame images in a frame buffer intended for output to a display device; and, a frequency management unit to periodically control, on a frame by frame basis, a processing frequency of the GPU based on a frame by frame estimate of a processing time for a current frame and an indicator of a remaining time before a target time to complete rendering of the current frame arrives.

EXAMPLE 2

The integrated circuit of example 1, wherein the frequency management unit is to set a minimum processing frequency based on an indicator controlled by an operating system component.

EXAMPLE 3

The integrated circuit of example 1, wherein the target time to complete rendering of the current frame is based on an indicator of a remaining time until a vertical synchronization signal occurs.

EXAMPLE 4

The integrated circuit of example 1, wherein the estimate of the processing time for the current frame is based on measured indicators of a plurality of processing times associated with corresponding plurality of previously rendered frames.

EXAMPLE 5

The integrated circuit of example 1, wherein the estimate of the processing time for the current frame is based on an average of a plurality of processing times associated with recently rendered frames.

EXAMPLE 6

The integrated circuit of example 1, wherein the frequency management unit is to change the processing frequency of the GPU after the GPU has started rendering the current frame.

EXAMPLE 7

The integrated circuit of example 1, wherein the frequency management unit is to change the processing frequency of the GPU before the GPU has started rendering the current frame.

EXAMPLE 8

A method of operating a graphics processing unit (GPU) to periodically, at a frame rate, render frame images in a frame buffer intended for output to a display device, comprising: operating the GPU at a first processing frequency; for each frame and occurring at least at the frame rate, while a current frame is being rendered, estimating a time remaining to complete a rendering of the current frame; for each frame and occurring at least at the frame rate, receiving an indicator of a time remaining before a deadline for completing the rendering of the current frame; and, while the current frame is being rendered, and based on the estimated time remaining to complete the rendering of the current frame, operating the GPU at a second operating frequency for at least a portion of the time remaining before the deadline for completing the rendering of the current frame arrives.

EXAMPLE 9

The method of example 8, wherein the GPU is operated at the second operating frequency based on the estimated time remaining to complete the rendering of the current frame exceeding the time remaining before the deadline for completing the rendering of the current frame.

EXAMPLE 10

The method of example 8, wherein the GPU is operated at the second operating frequency based on the time remaining before the deadline for completing the rendering of the current frame exceeding the estimated time remaining to complete the rendering of the current frame while operating at the first operating frequency.

EXAMPLE 11

The method of example 8, wherein the first processing frequency is determined by an operating system.

EXAMPLE 12

The method of example 8, wherein the deadline for completing the rendering of the current frame is based on a vertical synchronization signal.

EXAMPLE 13

The method of example 8, wherein the time remaining to complete the rendering of the current frame is based on a plurality of rendering times taken to render immediately preceding frames.

EXAMPLE 14

The method of example 12, further comprising: while a successive frame is being rendered, estimating a second time remaining to complete a rendering of the successive frame; receiving a second indicator of a second time remaining before a second deadline for completing the rendering of the successive frame; and, while the successive frame is being rendered, and based on the second estimated time remaining to complete the rendering of the successive frame, operating the GPU at the first operating frequency for at least a second portion of the second time remaining before the deadline for completing the rendering of the successive frame arrives.

EXAMPLE 15

A method of operating a graphics processing unit (GPU) to periodically, at a frame rate, render frame images in a frame buffer intended for output to a display device, comprising, for each frame: before receiving a command to begin rendering a current frame, operating the GPU at a first processing frequency; before receiving a first command to begin rendering the current frame, estimating a first time remaining to completely rendering the current frame; receiving an indicator of a first time remaining before a first deadline for completing the rendering of the current frame; and, before receiving the command to begin rendering the current frame, and based on the estimated time remaining to completely render the current frame, operating the GPU at a second operating frequency for at least a portion of the time remaining before the arrival of the first deadline for completely rendering the current frame.

EXAMPLE 16

The method of example 15, wherein the GPU is operated at the second operating frequency based on the estimated time remaining to completely render the current frame exceeding the time remaining before the first deadline for completing the rendering of the current frame.

EXAMPLE 17

The method of example 15, wherein the GPU is operated at the second operating frequency based on the time remaining before the first deadline for completing the rendering of the current frame exceeding the estimated time remaining to completely render the current frame.

EXAMPLE 18

The method of example 15, wherein the first processing frequency is determined by an operating system.

EXAMPLE 19

The method of example 15, wherein the time remaining to completely render the first frame is based on a plurality of rendering times taken to render immediately preceding frames.

EXAMPLE 20

The method of example 15, further comprising: after receiving the first command to begin rendering the current frame and before receiving a second command to begin rendering a successive frame, operating the GPU at the second processing frequency; before receiving the command to begin rendering the successive frame, estimating a second time remaining to complete a rendering of the successive frame; receiving an indicator of a second time remaining before a second deadline for completing the rendering of the successive frame; and, before receiving the command to begin rendering the successive frame, and based on the estimated time remaining to complete the rendering of the successive frame, operating the GPU at the first operating frequency for at least a portion of the time remaining before the second deadline for completing the rendering of the successive frame arrives.

The foregoing descriptions of the disclosed embodiments have been presented for purposes of illustration and description. They are not intended to be exhaustive or to limit the scope of the claimed subject matter to the precise form(s) disclosed, and other modifications and variations may be possible in light of the above teachings. The embodiments were chosen and described in order to best explain the principles of the disclosed embodiments and their practical application to thereby enable others skilled in the art to best utilize the various embodiments and various modifications as are suited to the particular use contemplated. It is intended that the appended examples be construed to include other alternative embodiments except insofar as limited by the prior art.

What is claimed is:

1. An integrated circuit, comprising:
   a graphics processing unit (GPU) to periodically render frame images in a frame buffer intended for output to a display device; and,
   a frequency management unit to periodically control, on a frame by frame basis, a processing frequency of the GPU based on a frame by frame estimate of a processing time for a current frame and an indicator of a remaining time before a target time to complete rendering of the current frame arrives, wherein the GPU processing frequency is controlled based on the estimated time remaining to complete the rendering of the current frame exceeding the time remaining before the deadline for completing the rendering of the current frame.

2. The integrated circuit of claim 1, wherein the frequency management unit is to set a minimum processing frequency based on an indicator controlled by an operating system component.

3. The integrated circuit of claim 1, wherein the target time to complete rendering of the current frame is based on an indicator of a remaining time until a vertical synchronization signal occurs.

4. The integrated circuit of claim 1, wherein the estimate of the processing time for the current frame is based on measured indicators of a plurality of processing times associated with corresponding plurality of previously rendered frames.

5. The integrated circuit of claim 1, wherein the estimate of the processing time for the current frame is based on an average of a plurality of processing times associated with recently rendered frames.

6. The integrated circuit of claim 1, wherein the frequency management unit is to change the processing frequency of the GPU after the GPU has started rendering the current frame.

7. The integrated circuit of claim 1, wherein the frequency management unit is to change the processing frequency of the GPU before the GPU has started rendering the current frame.

8. A method of operating a graphics processing unit (GPU) to periodically, at a frame rate, render frame images in a frame buffer intended for output to a display device, comprising:
operating the GPU at a first processing frequency;
for each frame and occurring at least at the frame rate, while a current frame is being rendered, estimating a time remaining to complete a rendering of the current frame;
for each frame and occurring at least at the frame rate, receiving an indicator of a time remaining before a deadline for completing the rendering of the current frame; and,
while the current frame is being rendered, and based on the estimated time remaining to complete the rendering of the current frame, operating the GPU at a second operating frequency for at least a portion of the time remaining before the deadline for completing the rendering of the current frame arrives, wherein the GPU is operated at the second operating frequency based on one of: 1) the estimated time remaining to complete the rendering of the current frame exceeding the time remaining before the deadline for completing the rendering of the current frame, and 2) the time remaining before the deadline for completing the rendering of the current frame exceeding the estimated time remaining to complete the rendering of the current frame while operating at the first operating frequency.

9. The method of claim 8, wherein the first processing frequency is determined by an operating system.

10. The method of claim 8, wherein the deadline for completing the rendering of the current frame is based on a vertical synchronization signal.

11. The method of claim 10, further comprising:
while a successive frame is being rendered, estimating a second time remaining to complete a rendering of the successive frame;
receiving a second indicator of a second time remaining before a second deadline for completing the rendering of the successive frame; and,
while the successive frame is being rendered, and based on the second estimated time remaining to complete the rendering of the successive frame, operating the GPU at the first operating frequency for at least a second portion of the second time remaining before the deadline for completing the rendering of the successive frame arrives.

12. The method of claim 8, wherein the time remaining to complete the rendering of the current frame is based on a plurality of rendering times taken to render immediately preceding frames.

13. A method of operating a graphics processing unit (GPU) to periodically, at a frame rate, render frame images in a frame buffer intended for output to a display device, comprising, for each frame:
before receiving a command to begin rendering a current frame, operating the GPU at a first processing frequency;
before receiving the command to begin rendering the current frame, estimating a first time remaining to completely rendering the current frame;
receiving an indicator of the first time remaining before a first deadline for completing the rendering of the current frame; and,
before receiving the command to begin rendering the current frame, and based on the estimated time remaining to completely render the current frame, operating the GPU at a second operating frequency for at least a portion of the time remaining before the arrival of the first deadline for completely rendering the current frame.

14. The method of claim 13, wherein the GPU is operated at the second operating frequency based on the estimated time remaining to completely render the current frame exceeding the time remaining before the first deadline for completing the rendering of the current frame.

15. The method of claim 13, wherein the GPU is operated at the second operating frequency based on the time remaining before the first deadline for completing the rendering of the current frame exceeding the estimated time remaining to completely render the current frame.

16. The method of claim 13, wherein the first processing frequency is determined by an operating system.

17. The method of claim 13, wherein the time remaining to completely render the current frame is based on a plurality of rendering times taken to render immediately preceding frames.

18. The method of claim 13, wherein the command is a first command, the method further comprising:
after receiving the first command to begin rendering the current frame and before receiving a second command to begin rendering a successive frame, operating the GPU at the second processing frequency;
before receiving the second command to begin rendering the successive frame, estimating a second time remaining to complete a rendering of the successive frame;
receiving an indicator of a second time remaining before a second deadline for completing the rendering of the successive frame; and, before receiving the second command to begin rendering the successive frame, and based on the estimated time remaining to complete the rendering of the successive frame, operating the GPU at the first operating frequency for at least a portion of the time remaining before the second deadline for completing the rendering of the successive frame arrives.

* * * * *